Nov. 17, 1942.  J. H. MAYNE  2,302,236
SANITARY CIRCULATORY MEAT TRAY HOLDER AND TRIM
Filed May 6, 1940
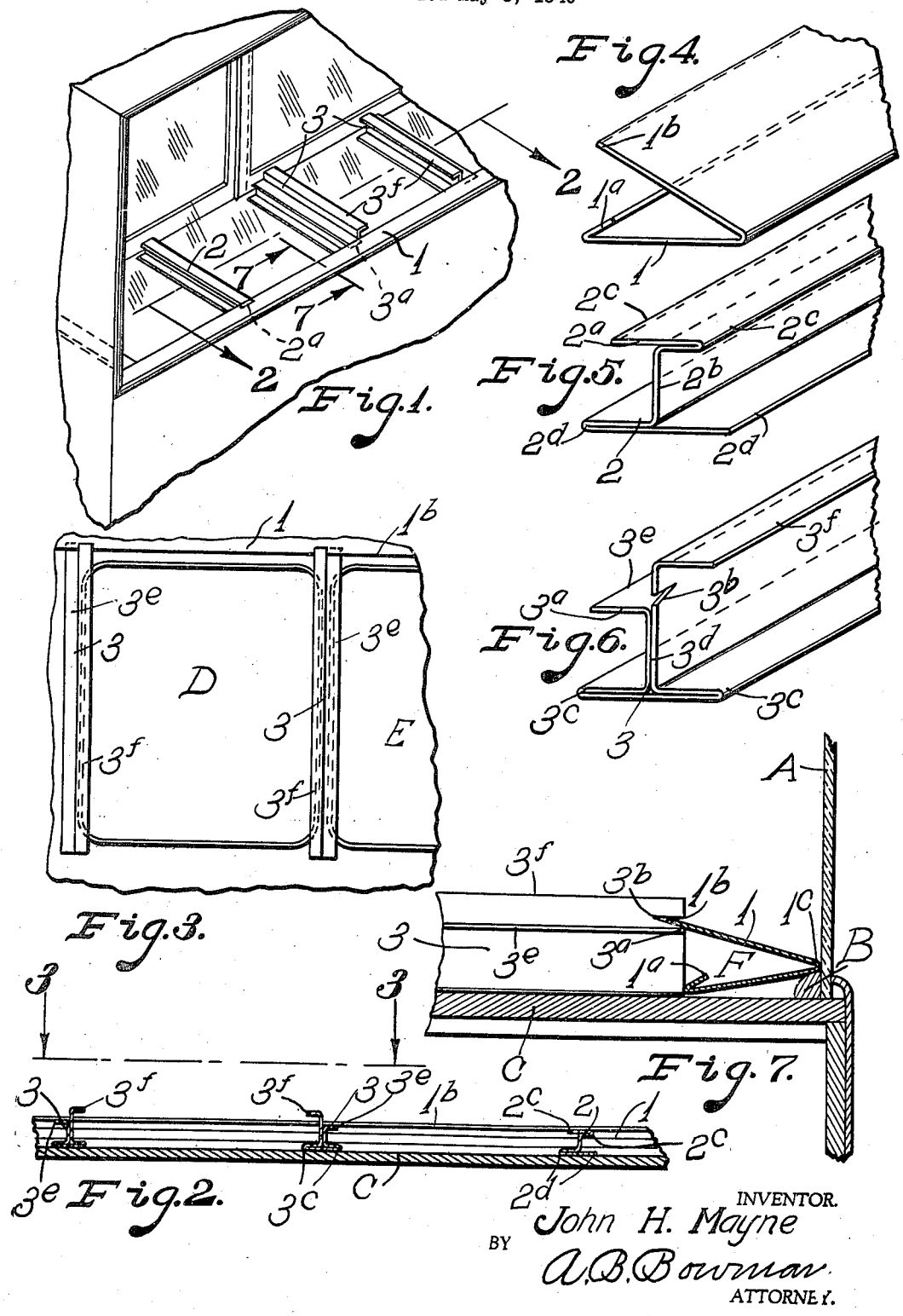
INVENTOR.
John H. Mayne
BY A. B. Bowman
ATTORNEY.

Patented Nov. 17, 1942

2,302,236

UNITED STATES PATENT OFFICE 2,302,236

SANITARY CIRCULATORY MEAT TRAY HOLDER AND TRIM

John H. Mayne, Escondido, Calif.

Application May 6, 1940, Serial No. 333,523

2 Claims. (Cl. 211—126)

My invention relates to a sanitary circulatory meat tray holder and trim, more particularly for use in supporting, separating and trimming meat trays in show cases and the objects of my invention are:

First, to provide a meat tray holder and trim of this class which is very sanitary for the reason that it does not collect dirt or other deleterious matter and is readily removable from show cases in which it is employed and is easy to keep clean;

Second, to provide a meat tray holder and trim of this class which is provided with smooth surfaces which are easily and quickly cleaned with a minimum of time and effort;

Third, to provide a meat tray holder and trim of this class which permits circulation of air around the meat trays held thereby;

Fourth, to provide a meat tray holder and trim of this class on which small pieces of meat may be positioned separate from the trays;

Fifth, to provide a meat tray holder and trim of this class which is arranged to support meat trays of various depths and widths adjacent each other;

Sixth, to provide a meat tray holder and trim of this class which permits the removal or insertion of trays therein without shifting or disturbing said tray holder and trim;

Seventh, to provide a meat tray holder and trim of this class which is arranged for use in various meat show cases now in use; and Eighth, to provide a meat tray holder and trim of this class which is very simple and economical of construction, efficient, durable and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which, Figure 1 is a fragmentary perspective view of a meat show case showing my sanitary circulatory meat tray holder and trim positioned therein; Fig. 2 is an enlarged fragmentary sectional view taken from the line 2—2 of Fig. 1; Fig. 3 is a fragmentary top or plan view of my sanitary circulatory meat tray holder and trim taken from the line 3—3 of Fig. 2 showing meat trays in connection therewith; Fig. 4 is an enlarged fragmentary perspective view of the circulatory trim member of my sanitary circulatory meat tray holder and trim; Fig. 5 is an enlarged fragmentary perspective view of one of the tray holder and trim members of my sanitary circulatory meat tray holder and trim; Fig. 6 is an enlarged fragmentary perspective view of another tray holder and trim member of my sanitary circulatory meat tray holder and trim; and Fig. 7 is an enlarged fragmentary sectional view taken from the line 7—7 of Fig. 1.

Similar characters of reference refer to similar parts and portions throughout the several views of the drawing:

The circulatory trim member 1 and the tray holder and trim members 2 and 3 constitute the principal parts and portions of my sanitary circulatory meat tray holder and trim.

The circulatory trim member 1 is substantially V-shaped in cross section and is provided with an inwardly extending angular portion 1a which is positioned in opposed relation with the outwardly diverging portion 1b, all as shown best in Figs. 4 and 7 of the drawing. This circulatory trim member 1 is arranged to be positioned adjacent the front show case glass window A and parallel therewith, with the apex 1c of the V-shaped portion resting on a molding B which is positioned adjacent the glass window A, all as shown best in Figs. 1 and 7 of the drawing.

It will be noted that the tray holder and trim members 2 and 3 are arranged to rest on the bottom C of the show case and the end portions 2a and 3a of these tray holder and trim members 2 and 3 respectively are arranged to extend beneath the diverging portion 1b of the circulatory trim member 1, as shown best in Figs. 1 and 7 of the drawing. It will be noted that each of the tray holder and trim members 3 are provided with notched portions 3b in their ends which are arranged to fit over the outwardly diverging portion 1b of the circulatory trim member 1, as shown best in Figs. 6 and 7 of the drawing.

The tray holder and trim member 2 is provided with a vertical supporting portion 2b which interconnects the laterally extending portions 2c and 2d. The laterally extending portions 2d extend outwardly from the vertical portion 2b some distance farther than do the laterally extending portions 2c. When the tray holder and trim members 2 are positioned in a show case, as shown in Fig. 1 of the drawing, the laterally extending portions 2c may be placed either above or below the laterally extending portions 2d, as desired providing a variation in the width of trim above and intermediate the trays in the relation, as shown in Fig. 3 of the drawing. The laterally extending portions 3c of the tray holder and trim members 3 are arranged to form a base for the tray holder and trim members 3 and the vertically positioned portions 3d are turned at right angles forming the laterally extending portions 3e and 3f, it being noted that the laterally extending portion 3f is positioned some distance above the laterally extending portion 3e which extends in the opposite direction to the laterally extending portion 3f, all as shown best in Fig. 6 of the drawing. It will be noted that a deep meat tray may be supported in the tray holder and trim member 3 in its one side under the laterally extending portion 3f and that a shallow meat tray may be supported in the tray holder and trim member 3 in opposed relation to the said deep meat tray beneath the laterally extending portion 3e, as shown best in Figs. 2 and 6 of the drawing. In Fig. 3 a meat tray D is placed adjacent a shallow tray E with one of my tray holder and trim members 3 interposed therebetween. The circulatory trim member 1 being positioned at the front side of the meat show case, provides circulatory space F which communicates with the trays intermediate each of the tray holder and trim members 2 and 3.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. A combination meat tray holder and trim including a middle vertical portion forming a closed trim portion at its upper side and arranged to extend between meat trays and space the same and having flat opposed laterally extended portions at the lower side of said vertical portion on which two adjacent meat trays may be supported in spaced relation to each other, said middle vertical portion being provided with opposed laterally extending portions at its upper side arranged to extend up over the upper side edges of the meat trays, one of said laterally extending portions being higher than the other extended portion and arranged to extend over a deeper meat tray.

2. A combination meat tray holder and trim including a middle vertical portion having a notch therein arranged to extend between meat trays and space the same and having flat opposed laterally extended portions at the lower side of said vertical portion on which two adjacent meat trays may be supported in spaced relation to each other, and a trim member provided with a circulatory space longitudinally therein positioned at a right angle to said combination meat tray holder and trim, said last mentioned trim member being substantially V-shaped in cross section with its open side positioned against the end of said combination meat tray holder and trim with its upper edge in said notch.

JOHN H. MAYNE.